Patented July 10, 1951

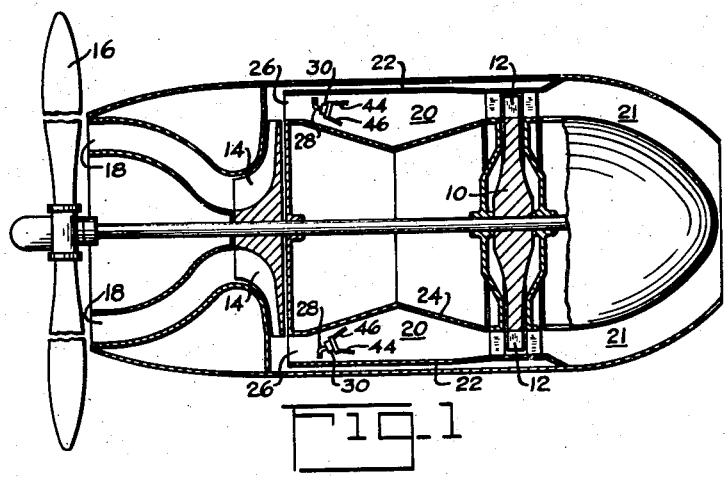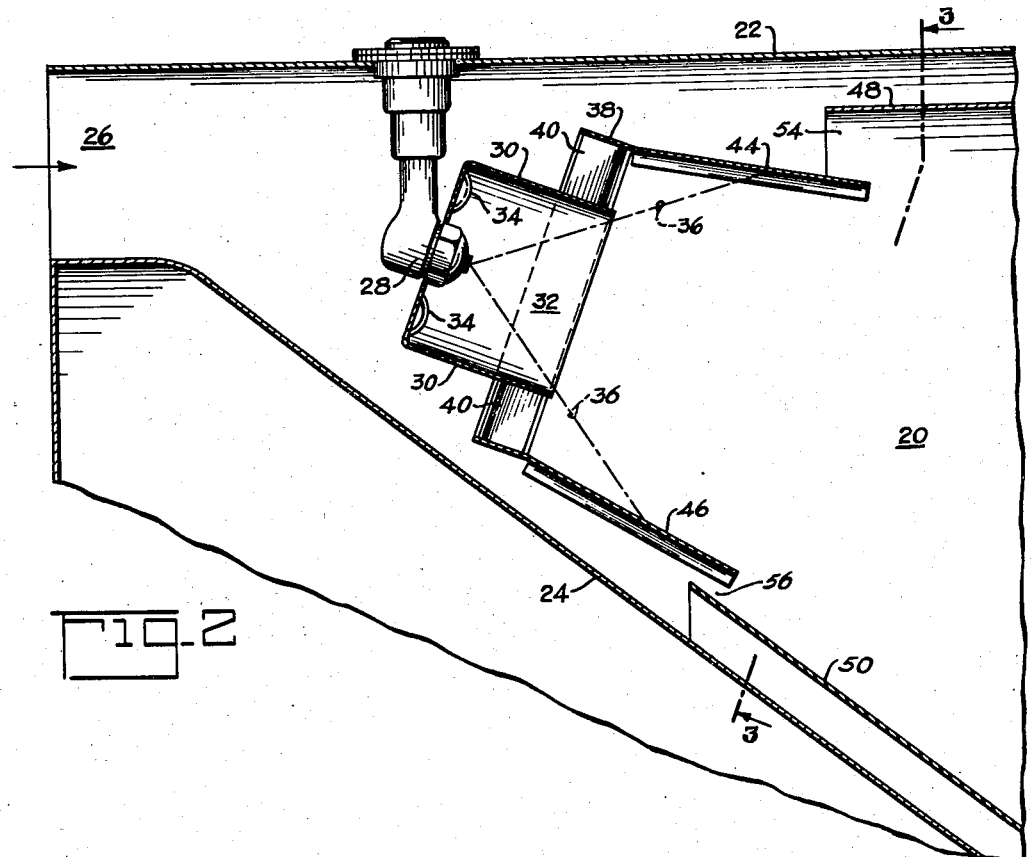

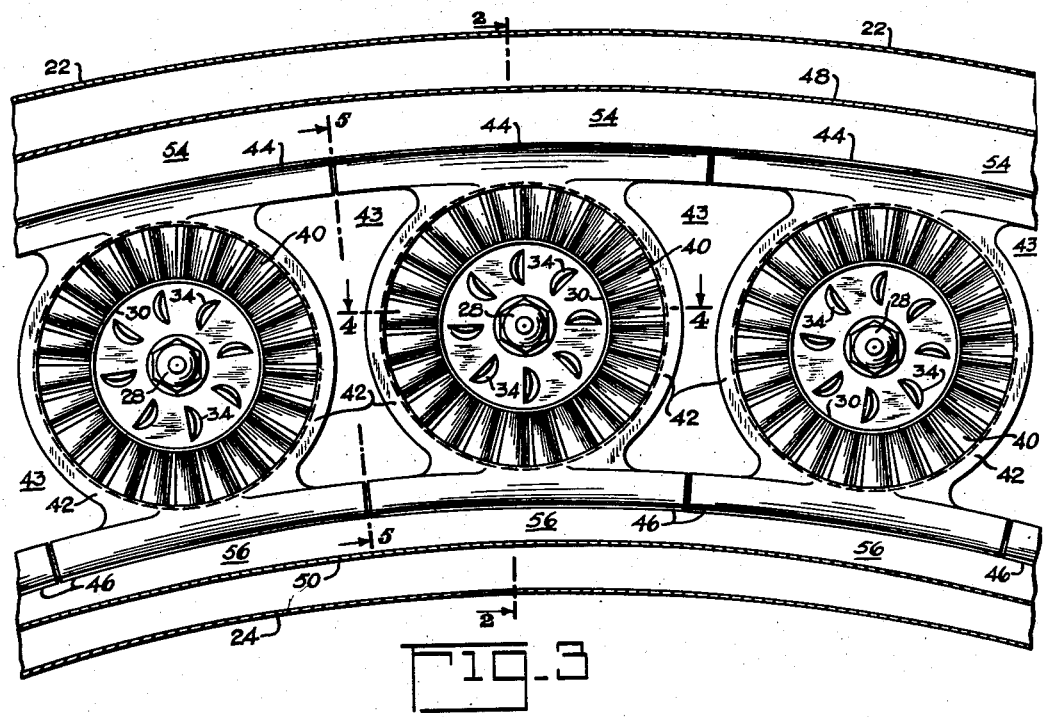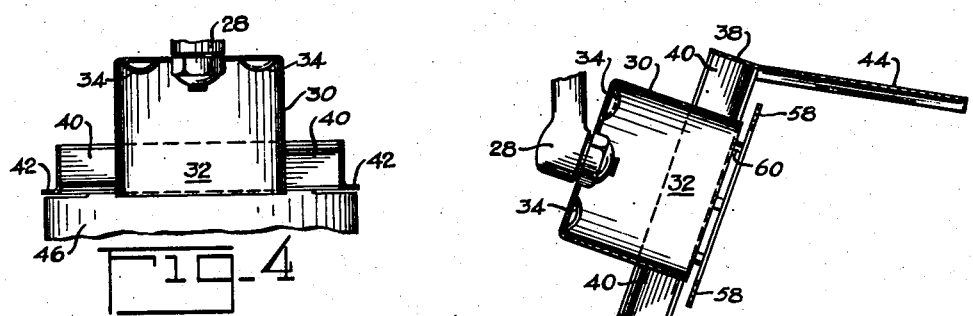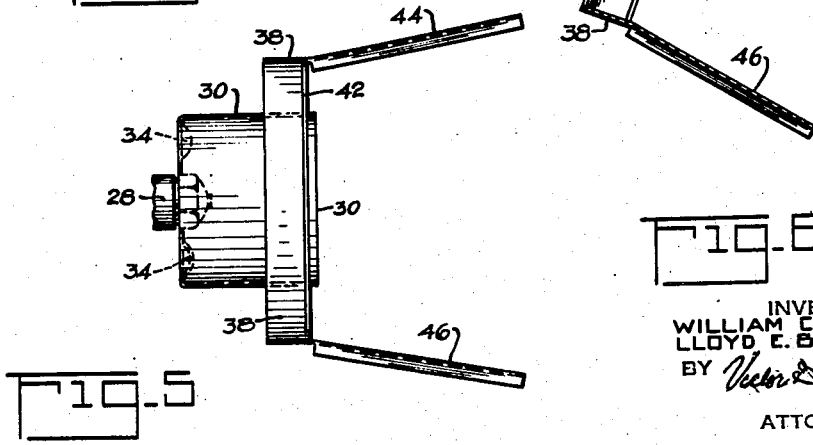

2,560,207

UNITED STATES PATENT OFFICE 2,560,207

ANNULAR COMBUSTION CHAMBER WITH CIRCUMFERENTIALLY SPACED DOUBLE AIR-SWIRL BURNERS

Lloyd E. Berggren, Roseland, and William C. Schaffer, Fair Lawn, N. J., assignors to Wright Aeronautical Corporation, a corporation of New York Application February 4, 1948, Serial No. 6,194

6 Claims. (Cl. 60—44)

This invention relates to combustion chamber structure and is particularly directed to means for controlling the feeding of fuel and air into said chamber and its subsequent mixing therein.

In a continuously burning combustion chamber for an engine—such as a gas turbine—considerable excess or secondary air must be mixed with the burned mixture in the combustion chamber in order to reduce the high temperature of the combustion gases. Thus at full power operation of a gas turbine, approximately four times more air than is necessary for complete combustion may be supplied to the turbine combustion chamber. At low power operation of the gas turbine, the air supplied to the turbine combustion chamber may be more than ten times the quantity needed for complete combustion. It is not possible to mix all this air with the fuel in the zone of initial or primary combustion because the resulting fuel-air mixture would be much too lean for combustion. Accordingly, only a portion of the air can be mixed with the fuel in the zone of initial combustion. An object of the invention comprises the provision of a combustion chamber structure having a sheltered region in which combustion can be initiated and maintained over a wide range of fuel-air ratios. In addition said structure is arranged to create turbulence in the burning mixture and combustion gases to insure substantially complete combustion before the combustion gases are mixed with secondary or cooling air and to facilitate mixture of said gases with said said secondary or cooling air.

Specifically the invention comprises a burner structure in which fuel is discharged into a turbine combustion chamber and a small percentage of the total air is supplied to said chamber is a whirling motion about the axis of said chamber for mixture with and for partial combustion of said fuel. This tubular burner chamber provides a sheltered region for initiation and maintenance of combustion. Upon discharge from said tubular burner chamber, the whirling mixture is mixed with additional air whirling in the opposite rotative direction about the axis of the burner for at least substantially completing said combustion. The mixture of said oppositely whirling masses creates considerable turbulence of the resulting combustion gases thereby facilitating the mixture of secondary or cooling air therewith.

Other objects of the invention will become apparent upon reading the annexed detailed description in connection with the drawing in which:

Figure 1 is a schematic sectional view illustrating a conventional gas turbine power plant;

Figure 2 is an axial sectional view through a combination combustion chamber and burner structure embodying the invention, said section being taken along line 2—2 of Figure 3;

Figure 3 is a sectional view taken along line 3—3 of Figure 2;

Figure 4 is a sectional view taken along line 4—4 of Figure 3;

Figure 5 is a view taken along line 5—5 of Figure 3; and

Figure 6 is an axial sectional view of a modified form of the invention.

The invention is illustrated and described in connection with the combustion chamber of a gas turbine power plant. Obviously, however, the invention is not limited to this specific application. In Figure 1, a gas turbine power plant is schematically illustrated as comprising a turbine rotor 10 having rotor blades 12 extending therefrom. The rotor 10 is drivably connected to a compressor 14 and, in the case of an aircraft engine, said turbine rotor may be drivably connected to an aircraft propeller 16. The compressor 14 has a forwardly directed air entrance opening 18 from which the compressor delivers compressed air to an annular combustion chamber 20. From the combustion chamber 20, the combustion gases are directed against the blades 12 of the turbine rotor 10, for driving said rotor, said gases discharging rearwardly therefrom through an annular exhaust duct 21.

Referring now to Figures 2 to 4 inclusive, the annular combustion chamber 20 comprises an outer annular shell 22 and an inner annular shell 24. The compressed air delivered by the compressor 14 is supplied to the combustion chamber 20 through an annular intake passage 26 and a plurality of fuel nozzles 28 are circumferentially spaced about said annular passage. As illustrated each fuel nozzle 28 is supported from the outer shell 22 of the combustion chamber 10 and in addition each fuel nozzle is oriented so that it is adapted to discharge fuel in the general direction of the air flow through the passage 26 into the combustion chamber 20. The fuel nozzles and associated structure are also schematically illustrated in Figure 1. A cylindrical burner member 30 is co-axially disposed about each fuel nozzle 28 and extends a substantial distance downstream from each such nozzle to form a chamber 32 in which combustion is initiated. The upstream end of each cylindrical burner member 30 comprises an air baffle which closes the upstream end of said member to air flow therein except for the restricted air flow path provided by openings formed in said end by air baffles 34 pushed out therefrom. Suitable igniter means (not shown) are provided for ignition of the combustion mixture in the burner chambers 32. Said igniter means may comprise conventional electric spark gaps.

The fuel nozzles 28 are conventional, each having a diverging conical spray pattern as indicated by the dot-and-dash lines 36 in Figure 2. Thus the fuel nozzles 28 may correspond to the prior art described in copending application Serial No. 782,163, filed October 25, 1947, by Berggren et al. The cylindrical burner members 30 extend downstream as far as possible from their respective nozzles without intercepting the fuel spray from said nozzles. That is, each burner chamber 32 is made as deep as possible without having its fuel spray strike the relatively cool walls of said chamber.

The air baffles 34 are directed so as to impart a whirling motion to the air entering therethrough into each burner chamber 32, thereby providing some mixing of said air with the fuel sprayed from the nozzle 28 for said chamber. As illustrated the air baffles 34 are disposed so as to cause a clockwise whirling motion, about the axis of its fuel nozzle as viewed in Figure 3, of the air entering each burner chamber 32.

A second cylindrical burner member 38 is coaxially disposed about each cylindrical burner member 30 and circumferentially spaced vanes or baffles 40 are secured therebetween. The baffles 40 are disposed so as to cause a whirling motion of the air discharging therefrom in the opposite rotative direction from that caused by the associated baffles 34. Thus as viewed in Figure 3, the baffles 34 cause a clockwise rotation of the air entering the burner chamber 32 while the baffles 40 cause a counter-clockwise rotation of the air supplied between the burner members 30 and 38, thereby providing a double air-swirl burner construction. For reasons of clarity, only one burner structure is illustrated in Figure 2.

A pair of flanges 42, formed on each cylindrical burner member 38, provide for attachment of suitable air baffle means between the adjacent cylindrical burner members 38 to control the air flow through the inter-burner spaces 43. Suitable inter-burner baffle means for this purpose is disclosed in a copending application of W. V. Hanzalek, Serial Number 6,140, filed Feb. 4, 1948.

Each cylindrical burner member 38 also has an extension or flame shield 44 extending downstream therefrom, said extension being rigid with the portion of said member facing the outer shell 22 of the annular combustion chamber 20 and comprising a cylindrical section co-axial with the axis of said chamber. Each said cylindrical extension 44 subtends a sufficient angle about the axis of the annular combustion chamber 20 so that its circumferentially spaced ends substantially abut the corresponding ends of the adjacent extensions 44, thereby forming an outer annular flame shield for the adjacent walls of the combustion chamber 20. The portion of each cylindrical burner member 38, facing the inner shell 24 of the combustion chamber 20, is provided with an extension 46, similar to its extension 44, the extensions 46 being rigid with their burner members 38 and being co-axial with the combustion chamber 20 to form an inner annular flame shield for said chamber.

The outer shell 22 of the combustion chamber 20 is provided with an annular liner 48 disposed adjacent thereto and overlapping the annular flame shield formed by the extensions 44. Similarly the inner shell 24 of the annular combustion chamber 20 is provided with an annular liner 50 overlapping the annular flame shield formed by the extensions 46.

With the above construction, fuel is sprayed into each burner chamber 32 from its nozzle 28 in a diverging conical spray for ignition in said chambers. The cone angle of said fuel spray pattern and the length of the burner chamber 32 is such that said spray just clears the downstream edge of said chamber. A small quantity of air enters each chamber 32 through the small openings, provided by the baffles 34, in the upstream end of said chamber, said air being caused to whirl about the axis of its chamber by the baffles 34, thereby causing some mixing of the fuel and air in said chamber. The whirling motion of the air entering each burner chamber 32 is imparted to the burning and combustion gases therein and, at the downstream end of each chamber 32, said gases mix with oppositely whirling air flowing between the associated cylindrical burner members 30 and 38. The air flow path between the burner members 30 and 38 is sufficiently large, in cross-sectional area, that the quantity of air flowing therebetween together with the air entering the burner chambers 32 directly, is at least substantially equal to that necessary for complete combustion of the fuel. The mixing of these oppositely whirling gas masses produces considerable turbulence downstream in the cylindrical burner members 30 and 38 thereby facilitating mixing and burning of said gases.

Additional or secondary air is supplied to the combustion chamber through the inter-burner spaces 43 and through the annular spaces 54 and 56 respectively formed between the annular inner and outer combustion chamber liners 48 and 50 and the adjacent flame shields 44 and 46. The turbulence of the combustion gases discharging from the burner members 30 and 38 facilitates mixture therewith of said secondary air.

The annular air flow path provided by the parallel overlapping disposition of the adjacent portions of the combustion chamber liner 48 and the flame shield 44 insures a flow of relatively cool air along the inner surface of said liner for some distance downstream before it mixes with the turbulent combustion chamber gases. Obviously there is a similar flow of relatively cool air along the inner surface of the combustion chamber liner 50 as a result of its overlapping disposition relative to the flame shield 46. In this way, at the relatively hot upstream end of the combustion chamber, the liners 48 and 50 and the walls of the combustion chamber are protected by said flow of relatively cool air. Some air also flows between the annular liners 48 and 50 and the walls 22 and 24 of the combustion chamber primarily for cooling said walls.

The cross-sectional area of the openings provided by the baffles 34 is a sufficiently small percent, preferably less than 10%, of the cross-sectional area of the chambers 32 in order that the axial velocity of flow through said chambers is low. For example, in a particular gas turbine power plant embodying the invention, said percent is less than 5%. In addition the quantity of air supplied to each burner chamber 32 through the openings provided by the baffles 34 is much less than that required for complete combustion.

For example, in said gas turbine power plant, only about 8% of the air required for complete combustion of the fuel, at rated engine power, is so supplied to the chambers 32. With this construction, both the magnitude and the axial velocity of the air flow through the burner chambers 32 is quite small. Accordingly each burner chamber 32 provides a relatively shielded region in which combustion can readily be initiated, in which danger of the combustion flame being blown out is minimized, and in which the combustion flame can be maintained over a wide range of fuel-air ratios so that the rate of fuel flow can be reduced to a low value for low power outputs of the gas turbine, without danger of the flame being extinguished.

As already stated, the quantity of air supplied directly to the burner chamber 32 through the openings provided by the baffles 34 is quite small. Preferably said quantity amounts to less than 5% of the total air supplied to the combustion chamber, for example, in an actual gas turbine power plant, said percentage is less than 2%. Of the remaining air for the combustion chamber 20 of said power plant, approximately one-third is supplied between the cylindrical burner members 30 and 38, one-third through the inter-burner spaces 43, and one-third through the annular spaces 54 and 56 between the burner extension 44 and 46 and the adjacent walls of the combustion chamber.

Because of manufacturing errors and/or because of turbulence within the burner chambers 32, fuel may strike and tend to collect on the downstream edges of the walls of each cylindrical burner member 30 forming a burner chamber 32. To prevent this, a baffle ring 58 (Figure 6) may be disposed in front of the downstream end of each cylindrical burner member 30 to direct some air from 40 inwardly over the downstream edges of the burner members 30. As illustrated, the baffle ring 58 is flat and is supported from each cylindrical burner member 30 by axial extensions 60. The structure of Figure 6 is otherwise identical to that of Figures 2 to 4 and like parts have been indicated by like reference numbers.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combustion apparatus: a combustion chamber having an air entrance passageway; a first tubular member disposed in said chamber adjacent to the upstream end of said chamber for air flow through said member; a main fuel nozzle for spraying fuel into said tubular member for combustion with air supplied to said chamber, said fuel nozzle being arranged to spray fuel co-axially into said first tubular member in a diverging conical spray and said first tubular member extending downstream from the discharge end of said nozzle to such an extent that said fuel spray just clears the downstream end of said first tubular member; first air baffle means providing a restricted air flow path into said tubular member such that the effective cross-sectional area of said restricted flow path is no greater than one-tenth that of the adjacent interior of said tubular member, said air baffle means being arranged to impart a whirling motion about the axis of said tubular member to the air entering said member through said flow path; a second tubular member co-axially surrounding said first tubular member, the air flowing between said tubular members mixing with the gases flowing from the downstream end of said first tubular member; and second air baffle means for imparting a whirling motion to air flowing between said tubular members, said last-mentioned whirling motion being co-axial with but opposite to the rotative direction of said first-mentioned whirling motion whereby considerable turbulence is created in said combustion chamber downstream of said first tubular member.

2. In combustion apparatus: a combustion chamber having an air entrance passageway; a first tubular member disposed in said chamber adjacent to the upstream end of said chamber for air flow through said member; a main fuel nozzle for spraying fuel into said tubular member for combustion with air supplied to said chamber, said tubular member extending downstream from said nozzle; first air baffle means providing a restricted air flow path into said tubular member such that the effective cross-sectional area of said restricted flow path is no greater than one-tenth of the adjacent interior of said tubular member, said air baffle means being arranged to impart a whirling motion about the axis of said tubular member to the air entering said member through said flow path; a second tubular member co-axially surrounding said first tubular member, the air flowing between said tubular members mixing with the gases flowing from the downstream end of said first tubular member; second air baffle means for imparting a whirling motion to air flowing between said tubular members, said last-mentioned whirling motion being co-axial with but opposite to the rotative direction of said first-mentioned whirling motion whereby considerable turbulence is created in said combustion chamber downstream of said first tubular member; and an annular baffle member co-axial with said tubular members and disposed so as to direct a portion of the air flowing between said tubular members inwardly over the downstream edge of said first tubular member.

3. In combustion apparatus: an annular combustion chamber having an annular air entrance passageway; a plurality of circumferentially spaced first tubular members disposed in said chamber adjacent to its upstream end for air flow through said members; a plurality of main fuel nozzles, one for each of said tubular members for spraying fuel into their respective tubular members for combustion with air supplied to said chamber, each of said tubular members extending downstream from its associated nozzle; a plurality of first air baffle means, one for each of said tubular members, for providing a restricted air flow path into said tubular members, the effective cross-sectional area of the flow path provided by each of said first baffle means being no greater than one-tenth that of the adjacent interior of its associated tubular member, said first air baffle means being arranged to impart a whirling motion about the axes of their respective tubular members to the air entering said tubular members through said flow paths; a plurality of second tubular members, each co-axial with and surrounding one of said first tubular members such that the air flowing through the flow paths between said co-axial pairs of tubular members mixes with the gases discharging from the downstream ends of their respective first tubular members; and a plurality of second air baffle means for the air flowing between each co-axial pair of first and second tubular members for imparting to said air a whirling motion co-axial with but opposite to the whirling motion imparted to the air entering their respective first tubular members, whereby considerable turbulence is created in said combustion chamber downstream of said first tubular members.

4. The combination recited in claim 3 including means providing first and second annular shield means forming an annular space therebetween co-axial with the axis of said annular combustion chamber and spaced from the walls of said combustion chamber, said annular space being disposed immediately downstream of said first and second tubular members such that said members discharge into said space.

5. In combustion apparatus: an annular combustion chamber having an annular air entrance passageway; a plurality of circumferentially spaced first tubular members disposed in said chamber adjacent to its upstream end for air flow through said members; a plurality of main fuel nozzles, one for each of said tubular members, for spraying fuel into their respective tubular members for combustion with air supplied to said chamber, each of said tubular members extending downstream from its associated nozzle; a plurality of first air baffle means, one for each of said tubular members, for providing a restricted air flow path into said tubular members, said air baffle means being arranged to impart a whirling motion about the axes of their respective tubular members to the air entering said tubular members through said flow paths; a plurality of second tubular members, each co-axial with and surrounding one of said first tubular members such that the air flowing through the flow paths between said co-axial pairs of tubular members mixes with the gases discharging from the downstream ends of their respective first tubular members; and a plurality of second air baffle means for the air flowing between each co-axial pair of first and second tubular members for imparting to said air a whirling motion co-axial with but opposite to the whirling motion imparted to the air entering their respective first tubular members whereby considerable turbulence is created in said combustion chamber downstream of said first tubular members, said second tubular members being spaced from each other and the annular walls of said combustion chamber to provide air flow paths therebetween into said combustion chamber, the relative cross-sectional area of said flow paths being such that less than 5% of the air entering said combustion chamber flows through the flow paths provided by said first air baffle means.

6. In combustion apparatus: an annular combustion chamber having an annular air entrance passageway; a plurality of circumferentially spaced first tubular members disposed in said chamber adjacent to its upstream end for air flow through said members; a plurality of main fuel nozzles, one for each of said tubular members, for spraying fuel into their respective tubular members for combustion with air supplied to said chamber, each of said tubular members extending downstream from its associated nozzle; a plurality of first air baffle means, one for each of said tubular members, for providing a restricted air flow path into said tubular members, said air baffle means being arranged to impart a whirling motion about the axes of their respective tubular members to the air entering said tubular members through said flow paths; a plurality of second tubular members, each co-axial with and surrounding one of said first tubular members such that the air flowing through the flow paths between said co-axial pairs of tubular members mixes with the gases discharging from the downstream ends of their respective first tubular members; and a plurality of second air baffle means for the air flowing between each co-axial pair of first and second tubular members for imparting to said air a whirling motion co-axial with but opposite to the whirling motion imparted to the air entering their respective first tubular members whereby considerable turbulence is created in said combustion chamber downstream of said first tubular members, said second tubular members being spaced from each other and the annular walls of said combustion chamber to provide air flow paths therebetween into said combustion chamber.

LLOYD E. BERGGREN.
WILLIAM C. SCHAFFER.

REFERENCES CITED

The following references are of record in the file of this patent:

UNITED STATES PATENTS

| Number | Name | Date |
|---|---|---|
| 2,227,666 | Noack | Jan. 7, 1941 |
| 2,402,377 | Davenport | June 18, 1946 |
| 2,404,335 | Whittle | July 16, 1946 |
| 2,470,184 | Pfenninger | May 17, 1949 |
| 2,504,106 | Berger | Apr. 18, 1950 |

FOREIGN PATENTS

| Number | Country | Date |
|---|---|---|
| 210,655 | Switzerland | Oct. 16, 1940 |
| 588,086 | Great Britain | May 14, 1947 |